May 5, 1931.　　　A. F. O'CONNOR　　　1,804,225
HAND BRAKE
Filed May 14, 1928　　2 Sheets-Sheet 1
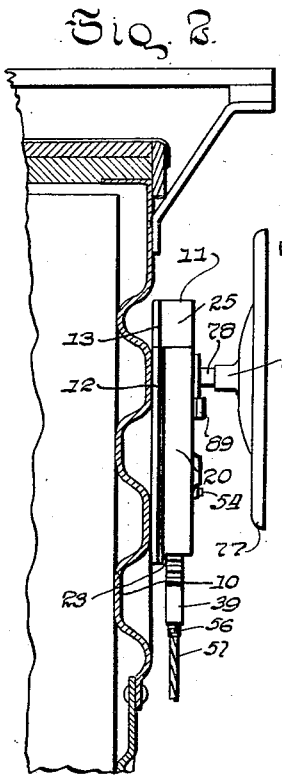
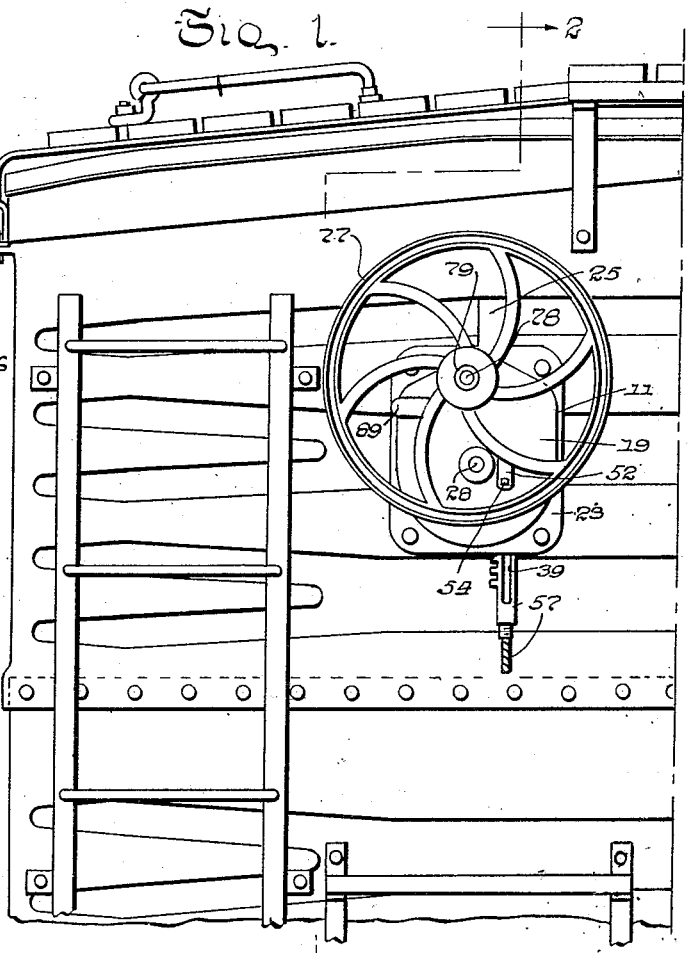
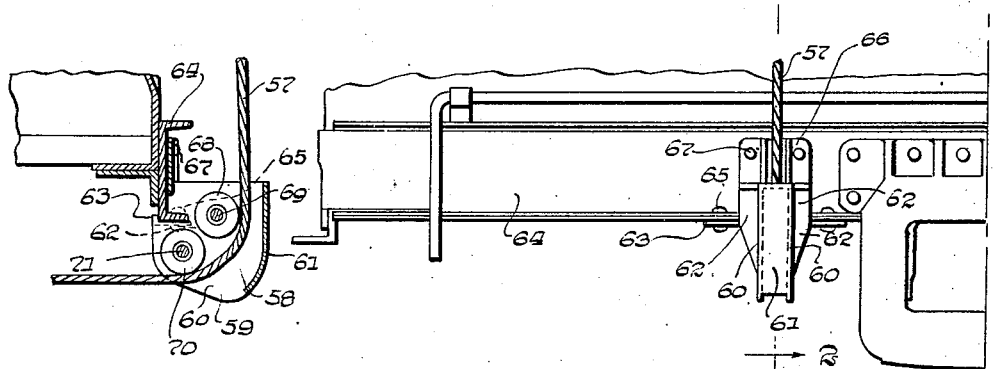
Witness
William P. Kilroy
Inventor,
Arthur F. O'Connor
By Samuel W. Banning
Atty.

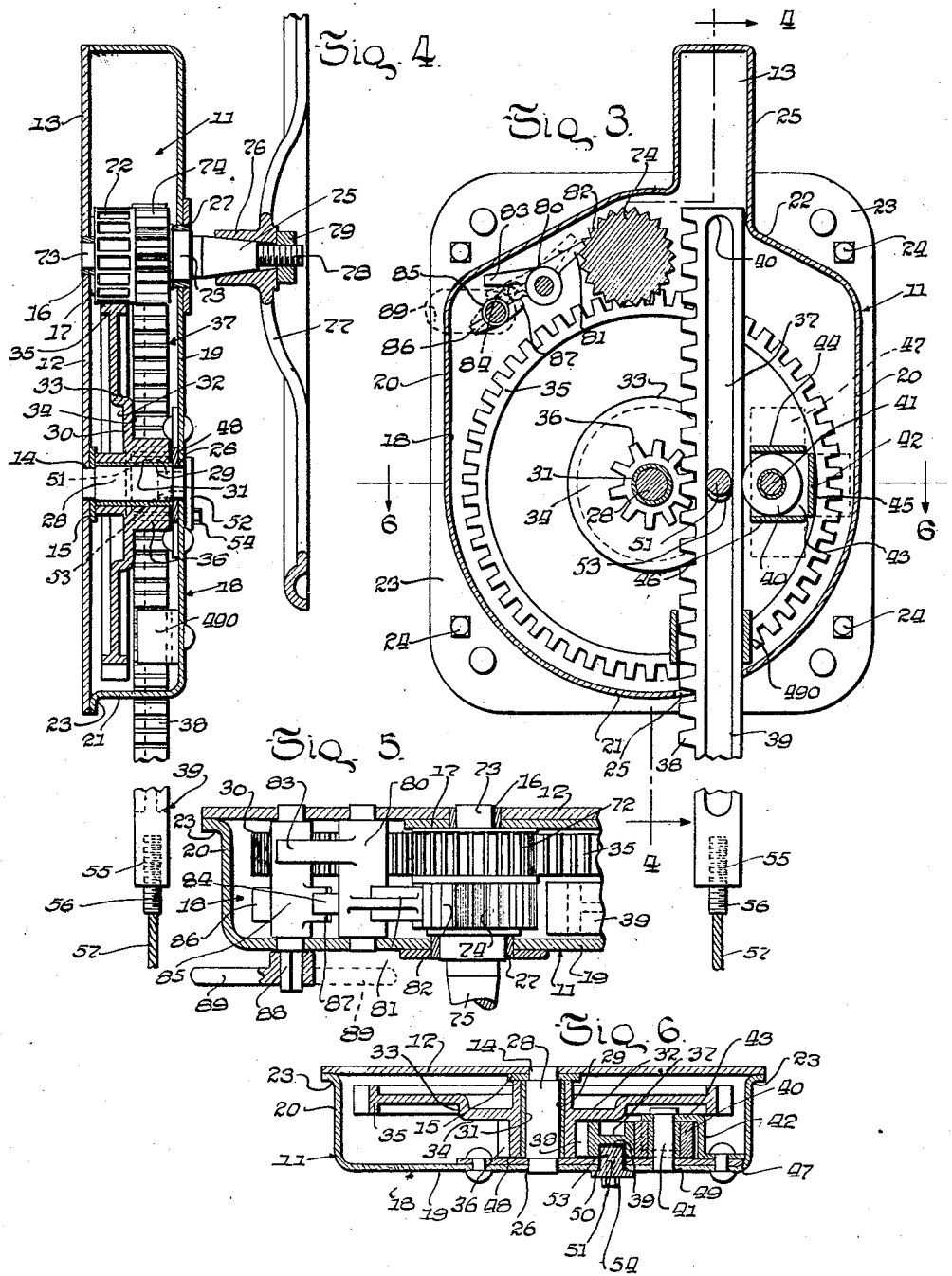

Patented May 5, 1931

1,804,225

UNITED STATES PATENT OFFICE

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS

HAND BRAKE

Application filed May 14, 1928. Serial No. 277,606.

This invention relates to improvements in hand brakes.

An object of the invention is to provide a hand brake for a railway car of the pull-up type in which a reciprocating rack bar is employed, together with means for driving the rack bar and guiding the same in its movement, in conjunction with novel pawl and ratchet mechanism for holding the brake in any desired position.

Another object of the invention is to provide a rack bar of the character indicated wherein reducing gearing is interposed between the driving member and the rack so that the power ratio is increased, the reducing gearing being of a novel construction wherein a large and small gear are integrally formed to rotate about a common center, when driven by a driving pinion, a ratchet wheel being integrally formed with the driving pinion and rotatable about the same center, for co-operation with a novel pawl and ratchet mechanism.

Still another object of the invention is to provide, in a brake of the type indicated, a pawl and ratchet mechanism wherein an actuating element is utilized for moving the pawl to engaged and disengaged position and holding the same in either of said positions under the influence of gravity.

A still further object of the invention is to provide means co-operable with the rigging extending from the rack bar to the brake rod, which include relatively small sheaves, arranged in such manner as to provide a gentle curve for the rigging member in its transition of movement from the substantially vertical to the horizontal, so as to have the effect of a relatively large sheave which cannot be employed within the space limits of standard requirements.

Other and further objects of the invention will more clearly appear from the description and claims hereinafter following.

In the drawings forming a part of this specification, Figure 1 is a broken end elevational view of a railway car, showing the invention applied thereto. Figure 2 is a vertical sectional view through the end wall of the car, corresponding substantially to the line 2—2 of Figure 1, and showing the invention in position thereon. Figure 3 is an enlarged vertical, sectional view through the brake housing and discloses the interior arrangement of the operating parts. Figure 4 is a vertical, sectional view of the invention corresponding substantially to the line 4—4 of Figure 3. Figure 5 is an enlarged, fragmentary, horizontal, sectional view through a portion of the housing and disclosing the pawl and ratchet mechanism forming a part of the invention. And Figure 6 is a horizontal, sectional view of the invention corresponding substantially to the line 6—6 of Figure 3.

As shown in the drawings, 10 indicates the end wall of a railway car, to which is secured a housing or casing 11 in which certain of the operating parts of the brake are mounted. The housing 11 includes a substantially flat rectangular supporting plate 12, secured to the end wall 10 of the car by suitable means such as rivets. The plate 12 has a flat extension 13 projecting from the upper edge thereof, and centrally of the plate there is provided a bearing opening 14 surrounded by reinforcing member 15, welded in position. Above the bearing opening, there is provided another bearing opening 16, also strengthened by suitable reinforcing member 17. A cup-shaped element 18 is provided which co-operates with the plate 12 to complete the housing, said element including a front wall 19, side walls 20—20, a curved bottom wall 21 and a top wall 22, of irregular outline, all of said walls being integrally formed. The edges of said walls have integrally formed therewith a laterally projecting flange 23 which rests flat against the plate 12 adjacent the edges thereof and is detachably secured to the plate 12 by screw bolts 24. The top wall 22 is provided with a hollow channel-shaped part 25 which co-operates with the projecting portion 13 of the plate 12 to provide a casing affording clearance for a moving part of the operating mechanism. The bottom wall 21 is provided with a slot 25ª in line with the extension on the housing. The front wall 19 of the cup-shaped element has a bearing opening 26 in line with the bearing opening 14, and also has an opening 27 in line with the opening 16 in the plate 12.

Mounted in the bearing openings 14 and 26 are the reduced ends of an axle 28 upon which is mounted the hub 29 of a gear member 30, there being a bushing 31 interposed between the hub 29 and the axle 28. Formed integrally with the hub 29 is a centrally disposed radially extending web 32, which is offset toward the rear as indicated at 33, to define an annular bearing face 34, and beyond the offset, the web extends some distance and merges with the rim of a gear of relatively large diameter, indicated at 35, said gear being adapted to co-operate with the driving pinion hereinafter referred to. The hub 29 of the gear member 30 on the outer or forward side of the annular bearing face 34, has formed thereon a gear 36 of considerably smaller diameter than the gear 35. Co-operating with the gear 36 and adapted to be reciprocated thereby is a rack bar 37 having teeth 38 which are engaged by the teeth of the gear 36. The rack bar is of considerable length and of H form in cross-section, providing slots at opposite sides thereof, one of which, indicated at 39, is closed at the top by an abutment indicated at 40. The rack bar 37 is held in engagement with the gear 36 by means of a roller 40, which is supported upon a spindle 41, the inner end of the latter being supported by means of a peculiarly shaped spider or bracket 42. The bracket 42 is provided with a supporting portion 43 in which the end of the spindle 41 is journaled, and with the supporting portion are integrally formed three walls 44, 45 and 46, each of which is provided with an outwardly projecting flange indicated at 47, the flanges being rigidly secured to the forward wall 19 of the housing. A reinforcing strip 48 is riveted to the front wall 19 of the housing in such manner as to reinforce the bearing opening 26 for the axle 28, and also to afford a bearing for the forward end of the spindle 41 as indicated at 49. Below the gear 36 and the roller 40, there is provided a channel-shaped bracket 490, the web of which is secured to the front plate 19 by a rivet, and the legs of which are disposed upon opposite sides of the rack bar 37. In line with the slot 39 in the rack bar, the front wall 19, and reinforcing strip 48 are provided with an oval-shaped slot 50, the major axis of which extends vertically. The slot 50 is adapted for the reception of a stop member 51 which projects into the groove 39 of the rack bar, as best shown in Fig. 6. The stop 51 is integrally formed with a strap 52 adapted to be disposed upon the outer side of the front wall 19 of the housing. Said stop on its inner end is provided with a projecting shoulder 53 adapted to be moved to position to overlap the edge of the slot in the reinforcing member 48 when in operative position.

The strap 52 is provided, adjacent its opposite end, with an aperture adapted to register with a threaded aperture in the front plate 19 when the said stop 51 is in position, the aperture being adapted for the reception of a screw bolt 54. By this arrangement, the stop member 53 is held in position by the use of only one bolt, the opposite end of the strap being maintained in position through engagement of the shoulder 53 with the inner face of the reinforcing plate 48 adjacent the elongated slot 50 therein.

The lower end of the rack bar 37 is provided with a threaded aperture 55 for the reception of a threaded member 56, to which a cable or chain may be connected, a cable 57 being shown in the drawings. The cable 57 extends downwardly and over sheave means indicated as a whole at 58, the cable 57, after it passes the sheave means, being connected with the brake rod, not shown.

The sheave means 58 include a housing 59 having spaced walls 60—60, which are connected by a web portion 61. The housing is also provided with ribs 62—62, to which are connected horizontally extending flanges 63, which are secured to the end sill 64 by means of rivets 65. The housing is also provided with upwardly extending flanges 66 which are secured by rivets 67 to the end sill 64. Mounted in the upper portion of the housing between the side walls 60—60 is a sheave 68 which is rotatably mounted on a pin 69. A second sheave 70 is mounted between the side walls 60—60 on a pin 71, which is located at one side of a vertical line extending through the center of the pin 69, and below the same, so that a line extending through the axes of the pins 69 and 71 lies approximately at 45° to the vertical.

The cable 57 passes between the connecting wall 61 and the two sheaves 68 and 70, and bears upon both of the same, and by reason of the disposition of the sheaves the cable, in its transition from the vertical to the horizontal, lies in a gentle curve corresponding in radius to the arc which would be defined by a very much larger sheave, were it possible to use the same in the limited space which the sheave means may occupy upon the car. By this arrangement, a sharp angle in the cable or chain is eliminated, preventing any tendency of the strands of the cable to break because of the sharp angle at which it would extend if only one sheave were utilized, reducing friction to the minimum, and preventing locking of the links of the chain when the latter is employed in place of the cable.

Also, by the use of the sheaves described, the disadvantages incident to the employment of the bell crank lever in place of a single sheave are eliminated. The bell crank lever arrangement depends for effective operation upon nice adjustments of the length of the brake chains or cable with respect thereto, whereas the construction herein described will operate effectively at all times regardless of the amount of the slack in the chain or cable, and also eliminates the changes in leverage which occur in connection with the bell crank lever arrangement.

The gear 35 is adapted to be driven by a pinion 72 mounted upon a spindle 73 which is rotatably supported in the bearing openings 16 and 27 of the housing 11. The pinion 72 is preferably formed integrally with the spindle 73, and also with a ratchet wheel 74 carried by said spindle. The outer end of the spindle 73 is provided with a tapered portion 75 for the reception of the hub 76 of a handwheel 77, the tapered portion having a reduced threaded end 78 for the reception of a binding nut 79.

Co-operating with the ratchet wheel 74 is a novel pawl operating mechanism. Mounted in suitable bearing openings in the plate 12 and front wall 19 of the housing is a pawl element 80 having integrally formed therewith a pawl 81 adapted to engage the ratchet teeth 82 of the ratchet wheel 74. The element 80 at one side of the pawl 81 is provided with a stop 83. In line with the pawl 81, the element 80 is provided with a tail piece 84 adapted to be engaged by a trip member 85.

The trip member 85 is journaled in the plate 12 and front wall 19 of the housing, and is provided with actuating portions 86 and 87, each of which in certain positions of the trip member 85 is adapted to engage the tail piece 84 of the rotatable element 80, and the stop 83 is adapted to engage the trip member to limit movement of the rotatable element 80. The outer end of the trip member is squared in cross section, as indicated at 88, and mounted upon the squared portion 88 is a handle 89, said handle being so disposed as to provide a gravity influenced portion for holding the trip member 85 in one position or another, as desired.

In operation, assuming it is desired to set the brake, the hand wheel 77 is rotated in a clockwise direction, imparting similar movement to the pinion 72 and the ratchet wheel 74. The pinion 72, by reason of its engagement with the gear 35, imparts counter-clockwise rotation thereto, which movement is transmitted to the gear 36 which directly engages the rack bar 37. Due to the presence of the relatively small driving pinion, and the relative sizes of the gears 35 and 36, the hand wheel 77 must be revolved a number of times to impart a single revolution to the gear 36. Due to the engagement of the gear 36 with the rack bar, the rack bar moves slowly upward, carrying therewith the cable 57, the rack bar being guided in its movements by means of the gear 36 and the roller 40, and also by means of the channel-shaped bracket 49ᵇ.

During rotation of the ratchet wheel 74 in a clockwise direction, the pawl mechanism and trip device are in the position illustrated in Fig. 3; that is, the pawl proper is in engagement with the teeth 82 of the ratchet wheel and is maintained in such engagement by reason of the fact that the actuating portion 87 bears beneath the tail piece 84 under the influence of the weight of the handle 89, the pawl, of course, being free to ratchet over the wheel during its clockwise movement, and preventing reverse rotation of the ratchet wheel. During the take up of the cable 57, the same will ride over the sheaves 68 and 70, and by reason of the disposition of the sheaves the sharp angle in the cable will be avoided. When it is desired to release the brake, the handle 89 is grasped and swung in a clockwise direction until such time as the actuating portion 86 strikes the tail piece 84 of the element 80, imparting to said element a counter-clockwise movement which disconnects the pawl 81 from the teeth 82 of the ratchet 74, and the pawl is held entirely free of the teeth of the ratchet wheel by reason of the weighted portion as provided by the handle 89, resting through the actuating portion 86 upon the tail piece 84, in this way permitting full unwinding movement of the gears and full release of the brakes. The downward movement of the rack bar 37, of course, is accomplished through the pull of the cable thereon when the brake is released, and the stop 51, by its engagement with the abutment 40 on the rack bar, limits downward movement of the latter.

While I have herein shown and described what I now consider the preferred manner of carrying out my invention, the same is merely illustrative and I contemplate all changes and modifications that come within the scope of the claims appended hereto.

I claim:—

1. In a hand brake mechanism of the character described, the combination with a supporting housing; of a rack bar adapted to reciprocate in said housing; a gear meshing with the teeth of the rack bar at one side of the same, and a roller carried by the supporting housing at the opposite side of said rack bar and bearing thereon, said gear and roller serving as guide means for said rack bar, and a second gear mounted to rotate about an axis common with the axis of said first gear, said second gear being of larger diameter and provided with an offset portion against which said rack member may bear; and means adapted to bear upon said rack bar at the side opposite to said offset portion.

2. In a hand brake mechanism of the character described, the combination with a support; of a rack bar reciprocably mounted in said support and provided with a longitudinally extending grooved portion, the adjacent wall of said support being provided with an elongated slot in line with said groove portion; of a stop member adapted to be extended through said opening into the groove of said rack bar, said stop being provided with a shoulder engageable with the inner wall of said support; and a strap connected with said stop member and secured exteriorly of said support.

3. In a hand brake of the pull-up type, the combination with the end wall of a railway car and a flexible element extending to the brakes proper; of a rack connected with said flexible element; of a driving pinion and a relatively large gear co-axially mounted and rotatable about a horizontal axis, said pinion being adapted to mesh with said rack for reciprocating the same in a vertical direction; of a roller mounted in line with said rack and adapted to bear thereon to maintain the same in operative engagement with the said driving pinion; a driving member and a ratchet wheel co-axially mounted and disposed vertically in line with said gear and pinion, said driving member being disposed in mesh with said gear; and pawl and ratchet mechanism including a pawl movable in the plane of said ratchet wheel.

4. In a hand brake of the pull-up type, the combination with the end wall of a railway car; of a housing having spaced front and rear walls; a pinion and a relatively large gear co-axially mounted for rotation in said housing between said walls; a spider member secured to one of said walls in a plane coinciding with the plane of said pinion, said spider carrying a roller; a rack extending within said housing between said roller and said pinion, said rack having teeth in mesh with said pinion; and means engageable with said gear for rotating the same to impart vertical reciprocation to said rack.

5. In a hand brake of the character described, the combination with a housing having front and rear walls; of a pinion and relatively larger gear co-axially disposed and rotably mounted in said housing; of a supporting spider mounted upon the wall of the housing adjacent said pinion and carrying a roller spaced from and in line with said pinion; a rack meshing with said pinion and extending between the latter and said roller at one side of said gear, said rack being provided with a longitudinally extending groove in one side; a stop member carried by the adjacent wall of said housing and extending into said groove member; a driving member and a ratchet wheel co-axially mounted for rotation in said housing, said driving member and ratchet wheel being disposed in a plane coinciding with the plane of said pinion and gear; and pawl mechanism within said housing and cooperating with said ratchet wheel to control the movements of said driving member and said gear.

6. In a hand brake of the character described, the combination of a housing comprising a base plate and a forwardly extending cup shaped casing affording a front wall in parallel spaced relation to the base plate, the housing being provided with a slot through its lower portion and an aligned extension projecting upwardly from its top portion, a rack entered through the slot and adapted to be moved upwardly into the extension and having teeth on its inner edge, a pinion meshing with the teeth of the rack, a gear connected with the pinion and in offset relation to the plane of the pinion, means engaging with the gear for rotating the same to impart vertical reciprocation to the rack, and a member bearing against the outer edge of the rack for holding the rack teeth in meshing relation with the pinion.

In witness that I claim the foregoing I have hereunto subscribed my name this 30th day of April, 1928.

ARTHUR F. O'CONNOR.